(12) United States Patent
Rayes et al.

(10) Patent No.: US 8,612,751 B1
(45) Date of Patent: Dec. 17, 2013

(54) METHOD AND APPARATUS FOR ENTITLED DATA TRANSFER OVER THE PUBLIC INTERNET

(75) Inventors: Ammar Rayes, San Ramon, CA (US); Subrata Dasgupta, San Jose, CA (US); Tom Deckers, Hoogstraten (BE); Venkataraman Sivasankaran, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 901 days.

(21) Appl. No.: 12/195,242

(22) Filed: Aug. 20, 2008

(51) Int. Cl.
  *G06F 11/30* (2006.01)
  *H04L 29/06* (2006.01)
  *H04L 9/32* (2006.01)

(52) U.S. Cl.
  USPC ........... 713/161; 713/175; 726/10; 726/26; 709/224; 702/188; 340/3.1; 340/3.6

(58) Field of Classification Search
  USPC .......... 713/150, 160, 161, 168, 175; 726/3, 5, 726/10, 26; 709/224; 702/188; 340/3.1, 340/3.43, 3.6
  See application file for complete search history.

(56) References Cited

U.S. PATENT DOCUMENTS

| 6,012,100 | A * | 1/2000 | Frailong et al. | 709/250 |
| 6,466,048 | B1 | 10/2002 | Goodman | |
| 6,664,803 | B2 | 12/2003 | Goodman | |
| 7,009,419 | B2 | 3/2006 | Goodman | |
| 7,065,566 | B2 * | 6/2006 | Menard et al. | 709/223 |
| 7,066,382 | B2 | 6/2006 | Kaplan | |
| 7,356,590 | B2 * | 4/2008 | Wilson et al. | 709/224 |
| 7,827,234 | B2 * | 11/2010 | Eisenberger et al. | 709/203 |
| 8,078,720 | B2 * | 12/2011 | Kawana | 709/224 |
| 2002/0178078 | A1 | 11/2002 | OToole | |
| 2005/0086502 | A1 * | 4/2005 | Rayes et al. | 713/189 |
| 2005/0108523 | A1 * | 5/2005 | West | 713/165 |
| 2006/0053058 | A1 * | 3/2006 | Hotchkiss et al. | 705/14 |

* cited by examiner

*Primary Examiner* — Zachary A Davis

(57) ABSTRACT

In one embodiment, a method for securely transferring entitled data from one or more devices in a customer's network to a vendor's network via a public network is described. The data is obtained from a collection module communicatively coupled to the devices. The obtained data is transformed into a format that is recognized by a backend server present in the vendor's network. The transformed data is then assorted by associating the transformed data with corresponding one or more devices. Finally, the assorted data is then encrypted and sent to the backend server securely via the public network along with entitlement attributes corresponding to the one or more devices.

18 Claims, 7 Drawing Sheets

METHOD AND APPARATUS FOR ENTITLED DATA TRANSFER OVER THE PUBLIC INTERNET

FIELD OF THE INVENTION

The present disclosure generally relates to secure transfer of data over a packet switched network. More specifically, the present disclosure relates to secure transfer of the data from a customer's network to a vendor network via a public network.

BACKGROUND OF THE INVENTION

With the advent of technology, computer networks are becoming an essential aspect of any organization's office and homes. More so with increasing size of these networks, maintenance of networking devices like routers and switches also becomes equally critical for service providers and vendors.

The service providers provide maintenance of the networking devices by monitoring the health and trying to troubleshoot or diagnose the faults in the networking devices. Usually, a customer calls a technical support group where a technical support engineer first tries to troubleshoot the problem in the networking device by providing technical resolution(s) to the customer. The customer may interact with the technical support engineer via a telephone, web messaging or through emails. These technical resolutions may even use public networks like the Internet for sharing the device information. However, if the technical support engineer fails to resolve the problem from remote assistance, he visits the customer's site for hands-on troubleshooting. This increases the overall time to repair a device and usually the customer gets irritated with this lengthy and somewhat disruptive process.

In other techniques service providers or vendors remotely monitor the networking devices to retrieve specific data from these networking devices, and remotely initiate troubleshooting action(s) to resolve the problem. The retrieved data from the networking devices is transferred from the customer's network to backend servers at the vendor's network over the Internet. However, these technical resolutions involving exchange of data generally invoke security concerns like eavesdropping. These security concerns become critical especially when the data that is transferred over the Internet is confidential and proprietary. Although various security techniques like data encryption are deployed, they are not completely secure.

In accordance with the foregoing, there is a need of a solution that allows customers to send data from their networked devices to the backend server securely even when transmitting over a public network.

OVERVIEW

In one embodiment, a method for securely transferring entitled data from one or more devices in a customer's network to a vendor's network via a public network is described. The method includes obtaining data from a collection module that is communicatively coupled to one or more devices. The data obtained from the collection module is transformed into a format recognized by a backend server present in the vendor's network. The transformation is performed depending on the format of the obtained data. The transformed data is then assorted by associating the transformed data with corresponding one or more devices. The assorted data is then encrypted and sent to the backend server securely via the public network along with entitlement attributes corresponding to the one or more devices.

DESCRIPTION OF EXAMPLE EMBODIMENTS

A method, system and software encoded in a computer-readable media are explained to transfer data corresponding to one or more devices present in a customer's network, securely via a public network to backend server present in a vendor's network. Firstly, data is obtained from the devices then it is processed in a format which can be recognized by a backend server at the vendor's network. The processed data is then sent to the backend server securely via the public network.

Figure 1:
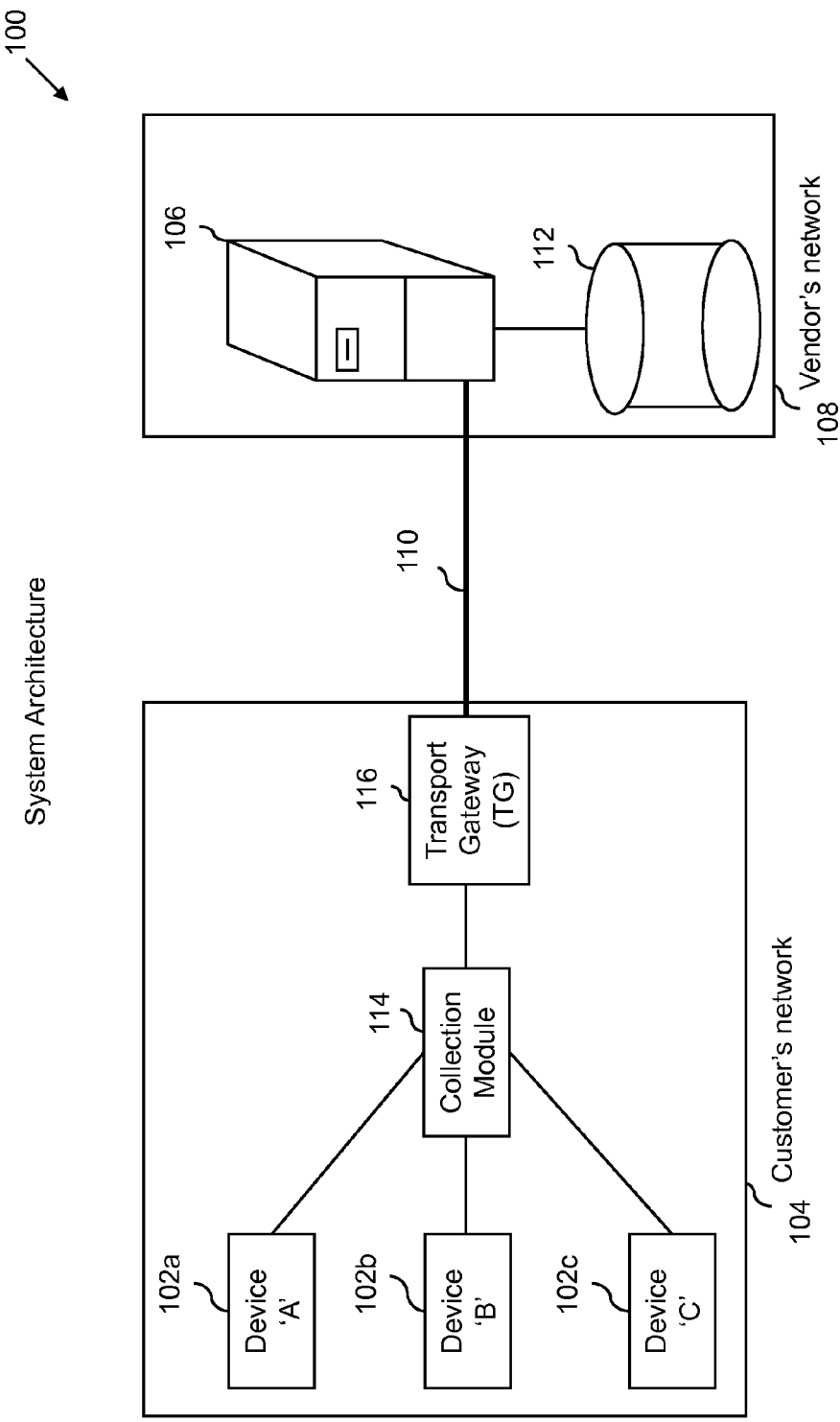
FIG. 1 illustrates an overview of a system architecture for providing entitled and secure transfer of data from devices in a customer's network to a backend server at a vendor's network, in accordance with an embodiment.

FIG. 1 illustrates an overview of system architecture for providing entitled and secure transfer of data from devices in a customer's network to a backend server at a vendor's network, in accordance with an embodiment. The figure illustrates a system 100 that provides an end to end solution to send data securely from plurality of devices 102a, 102b, and 102c present in a customer's network 104 to a backend server 106 present in a vendor's network 108 over a public network 110. Backend server 106 is a server present in vendor's network 108 that processes the data associated with devices 102a, 102b, and 102c. Hereinafter, backend server 106 is interchangeably referred to as server. The data that is transferred includes messages and reports such as, but not limited to, inventory messages, diagnostic messages, environmental messages, configuration messages, performance reports, fault management reports, and Service Level Agreement (SLA) reports. The inventory messages contain information about devices 102a, 102b, 102c such as their software version and their different software/hardware modules. The inventory messages are generated when a change like online insertion and removal (OIR) of a module in devices 102a, b, c occurs, or when a new device is registered on customer's network 104. The configuration messages contain startup/running configurations and these messages are triggered by a configuration event. The environmental messages contain information about environmental alarms for various parameters such as, but not limited to, clocks and power supply, and device conditions. In an embodiment, the environmental messages are triggered when temperature, power, or any other type of system-related thresholds are crossed resulting in alarms. The diagnostic messages contain information about diagnostic tests, i.e., status/result of the tests performed on one or more of devices 102a, 102b, and 102c. The diagnostic messages may be triggered when diagnostics test on one or more of devices 102a, 102b, and 102c fails.

The data is monitored and analyzed for diagnoses and troubleshooting by a Technical Assistance Centre (TAC) coupled to backend server 106. The examples of public network 110 could be the Internet, or a Local Area Network (LAN). For simplicity and a simple use case, reference numeral 110 is shown to be a public network. Note that 110 could also be a Virtual Private Network (VPN) or a private network.

Vendor's network 108 includes backend server 106 and a central repository 112. The data sent from customer's network 104 is received at backend server 106. Backend server 106 then correlates and validates the received data with devices 102a, 102b, and 102c. The correlation and validation of data is explained later in conjunction with FIG. 3. Customer's network 104 further includes a collection module 114 coupled to devices 102a, 102b, and 102c and a Transport Gateway (TG) 116 coupled to collection module 114. In accordance with an embodiment, TG 116 is a software application that allows a customer to connect to backend server 106. In accordance with an embodiment, devices 102a, 102b, and 102c need to be entitled before their data is sent to vendor's network 108. Hence, devices 102a, 102b, and 102c could be different type and the data generated from these devices 102a, 102b, and 102c may also be in different formats. Collection module 114 collects the data from each of these devices 102a, 102b, and 102c and stores the data in their respective formats. In one embodiment, collection module 114 stores data in an Extensible Markup Language (XML) format. In another embodiment, collection module 114 stores data in a Simple Network Management Protocol (SNMP) format. In yet another embodiment, collection module 114 stores output of a Command Line Interface (CLI) command sent to collect data from devices 102a, 102b, and 102c. In yet another embodiment, collection module 114 stores Syslog messages (i.e. system log messages). It will be apparent to a person of ordinary kill in the art that any protocol known in the art (even proprietary protocol is necessary) may be used for storing data in collection module 114 without deviating from the spirit and scope of the invention.

The data stored in collection module 114 is then retrieved by TG 116, which then transforms the collected data in a format that can be recognized by backend server 106. After transforming the data, TG 116 assorts the data by associating portions of the data with their corresponding devices 102a, 102b, and 102c. Thus, TG 116 acts as an aggregation point for sending data associated with different types of devices 102a, 102b, and 102c securely over public network 110 to vendor's network 108.

In accordance with various embodiments, in order to send the data securely to backend server 106 via TG 116 two types of registrations occur. The first type of registration is device registration. The second type of registration is TG registration. In the device registration, devices 102a, 102b, and 102c are associated with:

(a) a customer's profile registered with the vendor;
(b) a valid contract or warranty in the customer's profile that covers devices 102a, 102b, and 102c; and
(c) a company (or organization) which purchases devices 102a, 102b, and 102c.

In an embodiment, backend server 106 may include, or may be communicatively coupled with, an Enterprise Resource Planning (ERP) system that stores entitled company names associated with various customer profiles. At the time of registration of TG 116, such a customer profile and corresponding entitled company name is associated with TG 116.

Figure 2A:
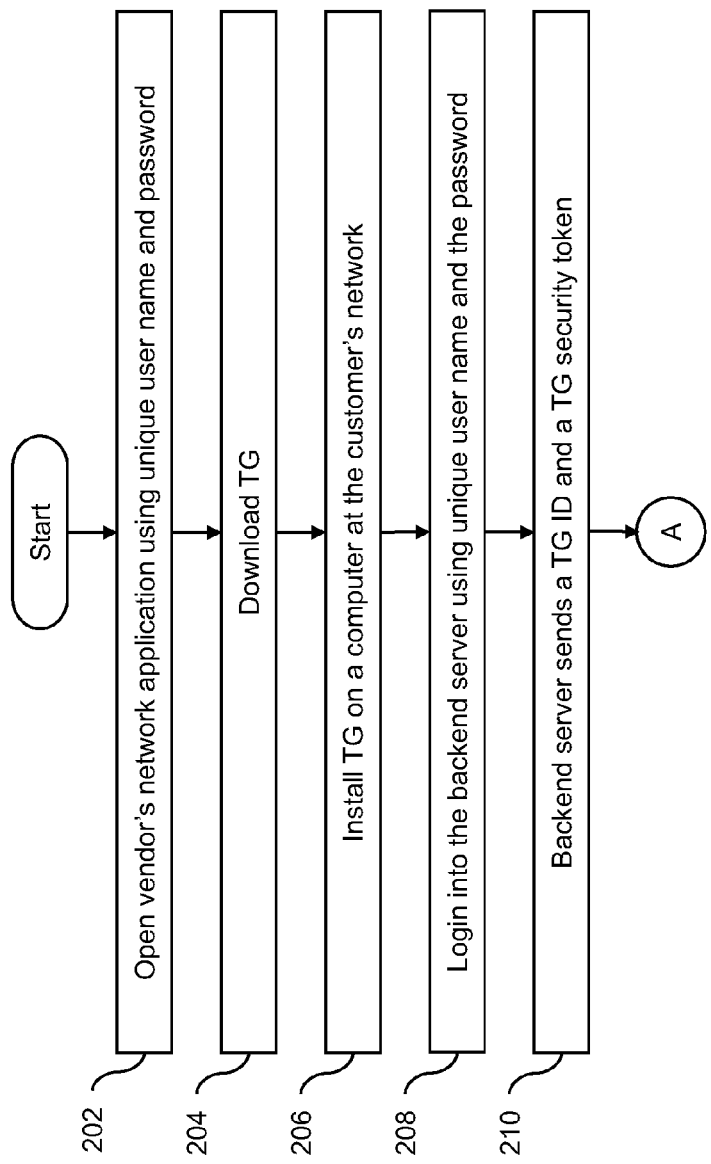
FIGS. 2A and 2B illustrate a flowchart depicting download and registration process of a Transport Gateway (TG) that is used for providing the entitled and secure data transfer in accordance with an embodiment.
Figure 2B:
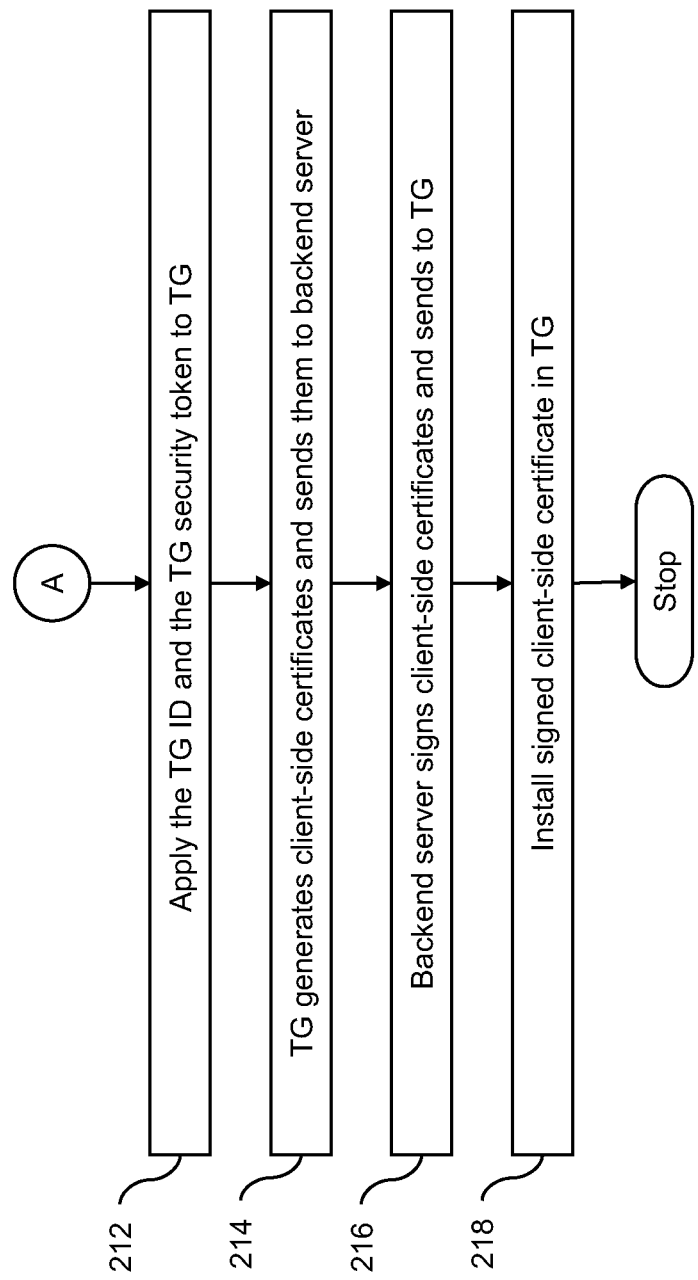

The second type of registration is TG registration. FIGS. 2A and 2B illustrate a flowchart depicting a download and registration process of TG 116 that is used for providing the entitled and secure data transfer in accordance with an embodiment. At step 202, the customer logs into vendor network 108 by opening vendor network application using a unique user name and password. Once the vendor network application authenticates the unique user name and password, the customer downloads TG 116 at step 204. In another embodiment, customer obtains a storage medium from the vendor that contains TG 116. Thereafter, at step 206, TG 116 is installed on a computer at customer network 104. In one embodiment TG 116 is installed on a computer that has Solaris™ operating system. In another embodiment, TG 116 is installed on a computer that has Windows™ operating system. Examples of Windows™ operating system are Windows™ 2000, Windows™ 2003 and Windows™ XP® platforms. It will be apparent to a person skilled in the art that the installation of TG is not limited by the operating system used.

Once TG 116 has been installed, its registration process starts. In one embodiment, at step 208, the customer uses a web browser to log into backend server 106 using his unique name and password. Thereafter, backend server 106 authenticates the unique username and password and sends a TG ID and a TG security token at step 210. In one embodiment the TG ID and the TG security token are sent through an email to an email address associated with the customer's profile. Thereafter, at step 212, after receiving the TG security token and the TG ID, the customer applies the TG ID and the TG security token to TG 116. At step 214, TG 116 generates client-side certificates and sends a request to backend server 106 to sign the client-side certificates. Thereafter, at step 216, backend server 106 signs the client-side certificates, and sends the client-side certificates back to TG 116. Backend server 106 stores a copy of TG 116's public certificate. Finally, at step 218, TG 116 receives the signed client-side certificates. The customer completes the registration process by installing the signed client-side certificates at TG 116. After TG has been successfully registered, TG 116 can send the data from devices 102a, 102b, and 102c securely via public network 110.

In another embodiment, the customer logs into backend server 106 using the unique username and password to initiate the registration process of TG 116. After authenticating the unique username and password, backend server 106 generates a TG ID and a TG password and sends them back to TG 116. Upon receiving the TG ID and the TG password, the customer completes the registration process of TG 116 by installing (or integrating) the TG ID and the TG password with TG 116 so that all future requests from TG 116 to backend server 106 will have the TG ID and the TG password for authentication by backend server 106. It will be apparent to a person of ordinary skill in the art that the device and TG registration processes are exemplary cases and are not limited to the disclosed methods. These registration processes may be extended to other processes as well and may also be used in conjunction with any known process.

Figure 3:
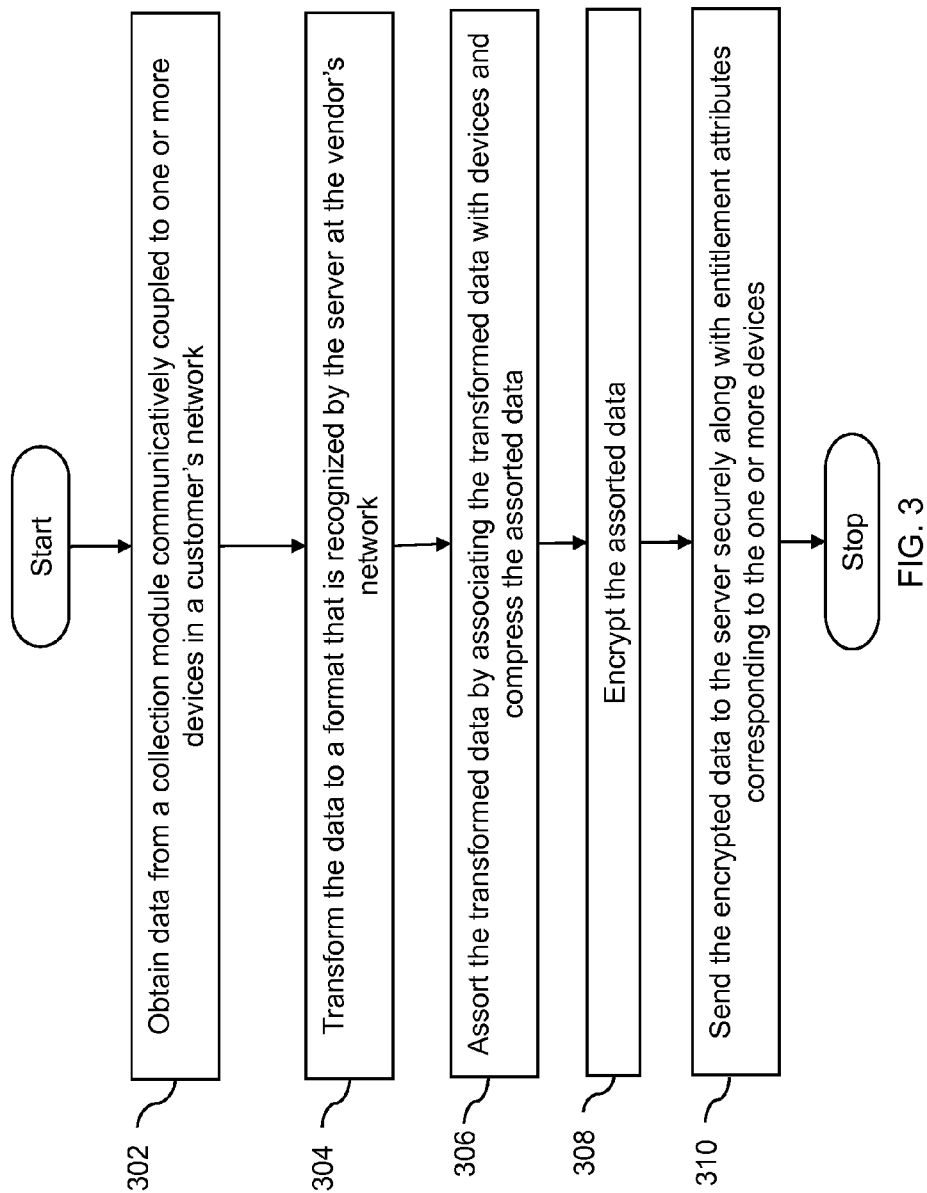
FIG. 3 illustrates a flowchart depicting a method for sending the data securely from the devices in the customer's network to the backend server at the vendor's network in accordance with an embodiment.

To send the data securely from customer's network 104 to backend server 106 in vendor's network 108 the data from devices 102a, 102b, and 102c needs to be transformed, packed and sent in such a way that it can be recognized by backend server 106. FIG. 3 illustrates a flowchart depicting a method for sending the data securely from devices 102a, 102*b*, and 102*c* in customer's network 104 to backend server 106 at vendor's network 108 in accordance with an embodiment. As explained above, collection module 114 obtains the data from different devices 102*a*, 102*b*, and 102*c* and stores them in their respective formats. In an embodiment, collection module 114 obtains the data by periodically polling devices 102*a*, 102*b*, and 102*c*. In another embodiment, devices 102*a*, 102*b*, and 102*c* themselves send their data to collection module 114 when they receive the customer's request through a CLI command. Thereafter, at step 302, TG 116 obtains the data from collection module 114. In various embodiments, TG 116 obtains the data from collection module 114 using at least one of Post Office Protocol version 3 (POP3), Internet Message Access Protocol (IMAP), or any other protocol.

Thereafter, at step 304, TG 116 transforms the data obtained from collection module 114 in a format that can be recognized by backend server 106. In one case when backend server 106 supports XML schema, TG 116 transforms the data obtained from collection module 114 into XML. In another case when backend server 106 understands binary data, TG 116 transforms the data obtained from collection module 114 into binary data like a memory dump that may be used to diagnose or debug errors in a device. In yet another case, when backend server 106 supports both XML schema and binary data or any other format, TG 116 transforms the data obtained from the collection module 114 into the format that can be recognized by backend server 106. In various embodiments, one or more of devices 102*a*, 102*b*, and 102*c* may generate data in a format that is recognized by backend server 106 and therefore TG 116 may not need to perform any format transformation of the data but may modify header bits of the received data packets so that backend server 106 can recognize that the data is sent by TG 116. In an embodiment, TG 116 adds metadata describing the nature of the data that is sent to backend server 106 in the header bits. The metadata also contains other information that facilitates backend server 106 to associate the received data with the customer's profile and hence route the data to an application at backend server 106 for analyzing and further processing.

Once the data is transformed, thereafter, at step 306, TG 116 assorts the transformed data. TG 116 assorts the transformed data by associating each portion of the transformed data with its corresponding devices. The transformed data along with its metadata is assorted such that it facilitates backend server 106 to identify portions of the data associated with corresponding devices. In an embodiment, TG 116 assorts the transformed data and then compresses that assorted data. The assorted data is compressed using techniques such as, but not limited to, ZIP a data file, Huffman Coding and Lempel-Ziv Coding. It will be apparent to a person skilled in the art that any compression technique may be used without limiting the spirit and scope of the invention. Also, in various embodiments the compression may not be performed after assortment of the data.

Thereafter, at step 308, TG 116 encrypts the assorted data. In one embodiment the assorted data is encrypted using Advanced Encryption Standard (AES). It will apparent to a person of ordinary skill in the art that AES is merely an example. Other encryption algorithms existing in the art that are pluggable and configurable can also be used. Thereafter, at step 310, TG 116 sends the encrypted data securely to backend server 106 along with entitlement attributes. The entitlement attributes are defined when devices 102*a*, 102*b*, and 102*c* are registered. These entitlement attributes are the unique identifiers for devices 102*a*, 102*b*, and 102*c*. The example of the unique identifier includes a serial number of a device.

In various embodiments, TG 116 uses a connection-oriented protocol, such as the Transmission Control Protocol (TCP), which ensures delivery of data to backend server 106.

Figure 4:
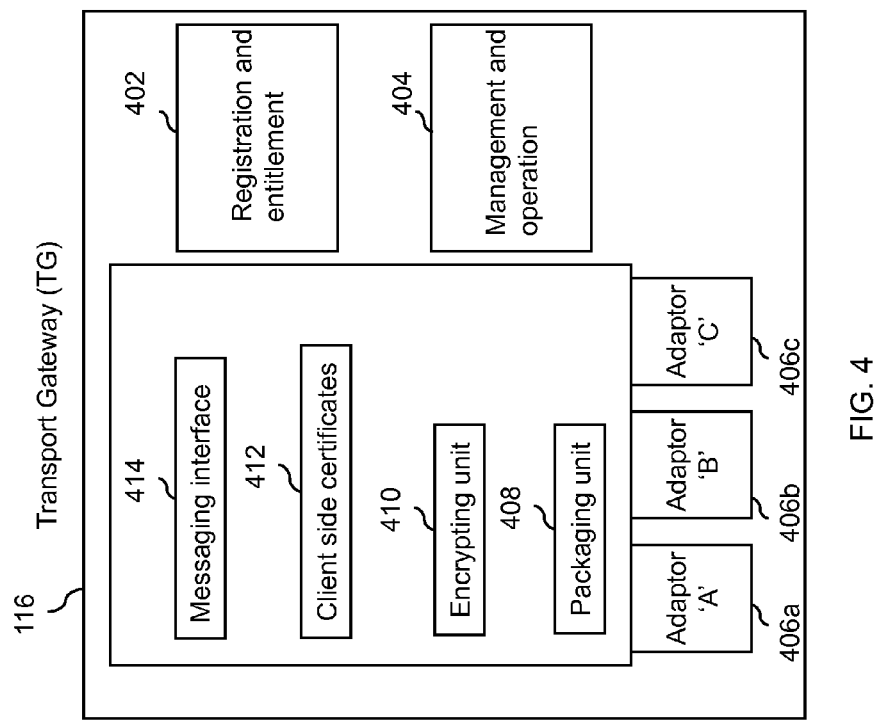
FIG. 4 illustrates a functional block diagram of the TG in accordance with an embodiment.

As described earlier, TG 116 can perform various functions to send the data from devices 102*a*, 102*b*, and 102*c* present at customer's network 104, securely via public network 110 to vendor's network 108. In an embodiment, different modules within TG 116 perform one or more of the above mentioned functions. FIG. 4 illustrates a functional block diagram of TG 116 in accordance with an embodiment. The block 402 shows the registration and the entitlement requirement of TG 116. To send data securely from devices 102*a*, 102*b*, and 102*c* to backend server 106, TG 116 first needs to be installed at customer's network 104 and registered with vendor's network 108. The TG registration is explained earlier in conjunction with FIG. 2. Moreover, devices 102*a*, 102*b*, and 102*c* are entitled as they are bound with the customer profile, the valid contract or warranty and the company to which they belong.

Once TG 116 is registered, it is authorized to send the devices' data to backend server 106. Block 404 depicts the management and operation capabilities of TG 116, where TG 116 polls collection module 114 at regular interval to obtain any updated data from devices 102*a*, 102*b*, and 102*c*. Once the data is obtained adaptors 406*a*, 406*b* and 406*c* transform the data (which is in multiple formats) into one format that is recognized by backend server 106. Thereafter, TG 116 uses a packaging unit 408 to assort the transformed data. Once the data is assorted, TG 116 uses an encrypting unit 410 to encrypt the assorted data. TG 116 attaches a client-side certificate 412 to the encrypted data for further security. This digital client-side certificate 412 helps the server to identify that the data is sent from customer's network 104 (i.e. client side). It will be apparent to a person of ordinary skill in the art that digital certificates are generally two-way certificates; hence a server-side certificate (corresponding to client side certificate 412) is used by backend server 106 for the authorizing and validating the device's data before processing it. Finally, TG 116 sends the encrypted data over Hyper Text Transfer Protocol Secure (HTTPS) connection to backend server 106. In an embodiment, TG 116 also provides a messaging interface 414 to the customer allowing him to register into TG 116, and check email reports sent by TG 116 to backend server 106. Messaging interface 414 also includes an API that is used to securely upload the data to backend server 106.

Figure 5:
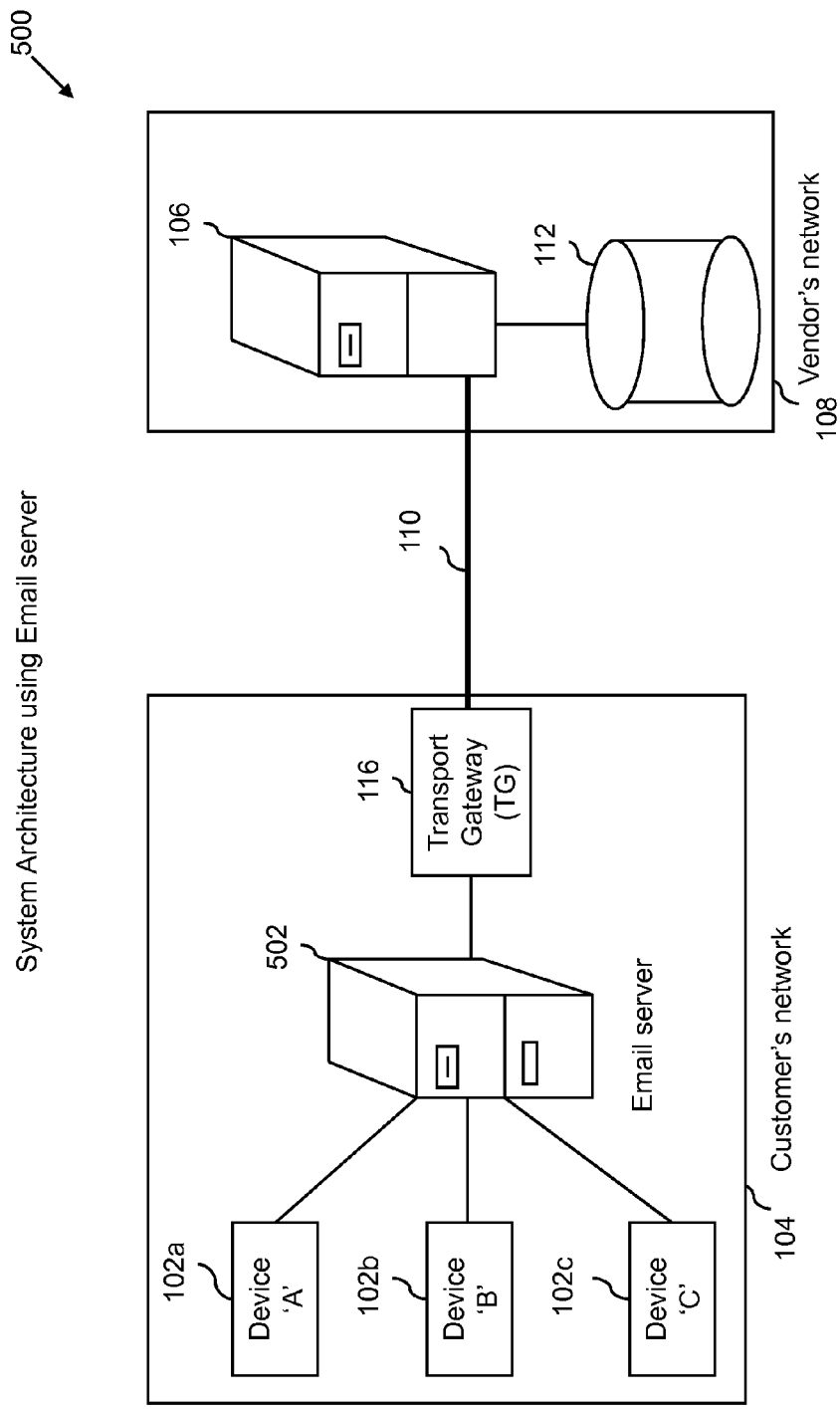
FIG. 5 illustrates first system architecture for providing entitled and secure transfer of data from devices, in accordance with a first embodiment.

As explained earlier, TG 116 obtains the data from collection module 114 which stores the data obtained from the devices 102*a*, 102*b*, 102*c*. It will be apparent to a person skilled in the art different collection modules can be used depending on the architecture under consideration. FIG. 5 illustrates first system architecture 500 for providing entitled and secure transfer of the data of devices 102*a*, 102*b*, and 102*c* in customer's network 104 to backend server 106 in vendor's network 108, in accordance with a first embodiment. In this embodiment, collection module 114 is an email server 502. Email server 502 obtains and stores the data from the devices 102*a*, 102*b*, and 102*c*. In one embodiment, devices 102*a*, 102*b*, and 102*c* send their data periodically to email server 502. In order to periodically send the data to email server 502, devices 102*a*, 102*b*, and 102*c* have an operating system installed that makes them capable of sending their data automatically to email server 502. In an embodiment, devices 102*a*, 102*b*, and 102*c* have Modular Internetwork Operating System (IOS) version 12.3(33) that uses a Simple Message Transfer Protocol (SMTP) to send data to email server 502. The data contains configuration, diagnostics, environmental, inventory and system log information that is collected at scheduled intervals by email server 502.

In another embodiment, devices 102*a*, 102*b*, and 102*c* send the data to email server 502 upon receiving a customer's CLI request. TG 116 present in customer's network 104 polls email server 502 to check for any data from devices 102*a*, 102*b*, and 102*c*. In one embodiment, TG 116 and email server 502 are installed on the same computer. In another embodiment, TG 116 and email server 502 are installed on different computers. In an embodiment, TG 116 retrieves the data from email server 502 using POP3 protocol. In another embodiment, TG 116 retrieves the data from email server 502 using IMAP. After obtaining the data from email server 502, TG 116 transforms the data to XML schema so that it can be recognized by backend server 106. TG 116 transforms the data by modifying header bits of data packets. After the data has been transformed, TG 116 assorts the transformed data to associate a portion of the transformed data with its corresponding sending device. Thereafter, TG 116 compresses the assorted data using any known compression techniques. After the data has been compressed, TG 116 encrypts the compressed data using AES. Thereafter, TG 116 sends the encrypted data over HTTPS to backend server 106.

Figure 6:
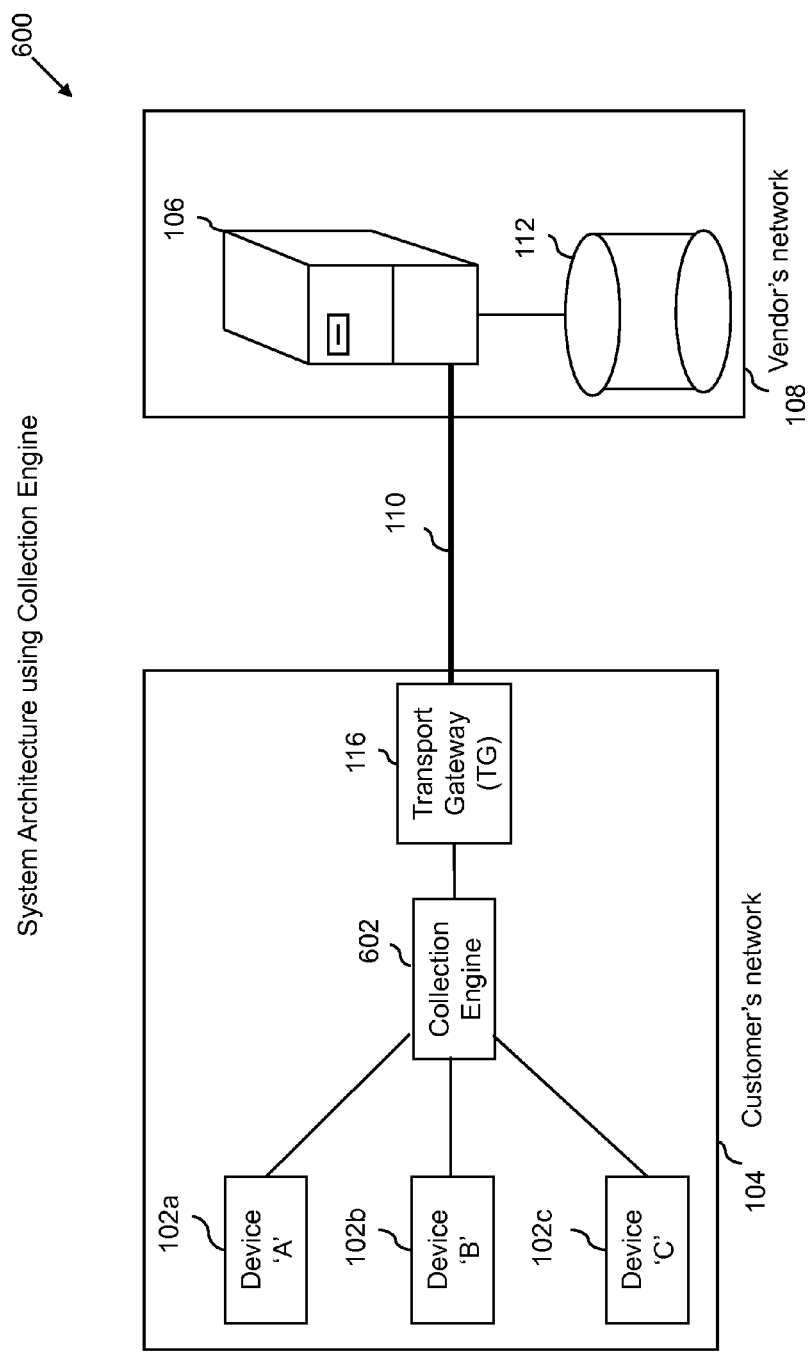
FIG. 6 illustrates second system architecture for providing entitled and secure transfer of data from devices, in accordance with a second embodiment.

As explained earlier, collection module 114 is different in different system architectures. FIG. 6 illustrates second system architecture for providing entitled and secure transfer of the data from devices 102*a*, 102*b*, and 102*c* in customer's network 104 to backend server 106 in vendor's network 108, in accordance with a second embodiment. The data from devices 102*a*, 102*b*, and 102*c* is obtained and collected by a collection engine 602. In an embodiment collection engine 602 is vendor network's 108 proprietary collection unit that is the primary interface with all devices in customer's network 104. In another embodiment collection engine 602 is a third party network's proprietary collection unit that interfaces with all devices in customer's network 104. In this case, the third party network may have an understanding with vendor's network 108 that TG 116 interfaces with collection engine 602 for further processing of the data obtained from devices 102*a*, 102*b*, and 102*c*. Collection engine 602 polls devices 102*a*, 102*b*, and 102*c* at regular intervals to obtain the data. In this embodiment, the data obtained from devices 102*a*, 102*b*, and 102*c* is in SNMP format. TG 116 continuously monitors collection engine 602 to check for availability of any new data from devices 102*a*, 102*b*, and 102*c*. Thereafter, TG 116 transforms the data from SNMP format to the binary format (as memory dump) so that it can be recognized by backend server 106. After the data has been transformed to the memory dump, TG 116 assorts and compresses the data. After the data has been compressed, TG 116 encrypts the compressed data and sends this encrypted data to backend server 106 over an HTTPS connection. In an embodiment, backend server 106 analyses the data sent by TG 116 and sends its analysis results to the customers. In one embodiment, the analysis results are sent through emails to an email address associated with the customer's profile. In another embodiment, the analysis results are sent through electronic paging technique (epage).

The end-to-end solution explained above benefits both the customer and the vendor. The customer gets preemptive diagnosis of his network devices, while the vendor is able to maintain control over its devices. Also, the ability to send the data of all the devices collectively via a single channel using the TG reduces the need to open multiple firewall ports in each device separately. Moreover, this also improves the data transmission rates as it is a single channel and the data is also compressed. Further, sending the data via the TG also prevents the customer from enabling all devices with client-side security certificates.

In the foregoing specification, specific embodiments have been described. However, one of ordinary skill in the art will appreciate that various modifications and changes can be made without departing from the scope of the present invention as set forth in the claims below. Accordingly, the specification and the figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential feature(s) or element(s) of any or all the claims.

The invention claimed is:

1. A method for transferring entitled data securely via a public network, the method comprising:
   registering each of a plurality of devices in a customer network with a vendor network to confirm that each of the plurality of devices is entitled to transfer data to a server in the vendor network, wherein registering a first one of the plurality of devices comprises:
      associating the first one of the plurality of devices with a customer profile registered with the vendor; and
      associating the first one of the plurality of devices with a valid contract or warranty in the customer profile that covers the first one of the plurality of devices;
   registering a transport gateway in the customer network with the vendor network, wherein the transport gateway is configured to connect a collection module to the server in the vendor network;
   obtaining data from the collection module communicatively coupled to the plurality of devices, wherein the plurality of devices provide the collection module with data in a plurality of different formats;
   transforming the data obtained from the collection module into a format recognized by the server, wherein transformation is performed depending on the different formats of the data obtained from the collection module;
   assorting the transformed data by associating the transformed data with each of the plurality of devices;
   encrypting the assorted data; and
   sending the encrypted data, along with entitlement attributes of each of the plurality of devices, to the server securely via the public network through a single channel.

2. The method of claim 1, wherein the data comprises at least one of an inventory report, a diagnostics report, an environmental report, and a configuration information report.

3. The method of claim 1, wherein the data is obtained from the collection module using one of Post Office Protocol version 3 (POP3) or Internet Message Access Protocol (IMAP).

4. The method of claim 1, wherein the data is obtained from the collection module by periodically polling the collection module.

5. The method of claim 1, wherein transforming the data comprises performing one or more of the following:
   converting the obtained data into an Extensible Markup Language (XML) schema; and
   modifying a header of the data.

6. The method of claim 1, wherein the assorted data is encrypted using the Advanced Encryption Standard (AES).

7. The method of claim 1, wherein the encrypted data is sent securely by:
   attaching a digital certificate to the encrypted data; and sending the encrypted data using a Hypertext Transfer Protocol over Secure Socket Layer (HTTPS) connection to the server via the network.

8. The method of claim 1, wherein the entitlement attributes sent along with the encrypted data are generated during registration of the plurality of devices.

9. The method of claim 1, further comprising authenticating at the server the received encrypted data using the entitlement attributes to complete secure transfer of the data from the plurality of devices to the server.

10. A system for transferring entitled data securely via a public network, the system comprising:
  a plurality of devices in a customer network, the plurality of devices being configured to be registered with a vendor network to confirm that each of the plurality of devices is entitled to transfer data to a server in the vendor network, wherein a first one of the plurality of devices is configured to be registered by: being associated with a customer profile registered with the vendor and being associated with a valid contract or warranty in the customer profile that covers the first one of the plurality of devices;
  a collection module in communication with the plurality of devices and configured to collect data, in a plurality of formats, from the plurality of devices; and
  a Transport Gateway (TG) coupled to the collection module, configured to be registered with the vendor network, and configured to:
    obtain data from the collection module;
    transform the data obtained from the collection module into a format recognized by the server, wherein transformation is performed depending on the different formats of the data obtained from the collection module;
    assort the transformed data by associating the transformed data with each of the plurality of devices;
    encrypting the assorted data; and
    send the encrypted data to the server securely via the public network along with entitlement attributes of each of the one or more devices through a single channel.

11. The system of claim 10, wherein the TG is associated with the plurality of devices.

12. The system of claim 10, wherein the collection module is one of an email server and a collection engine.

13. The system of claim 10, wherein the data comprises at least one of an inventory report, a diagnostics report, an environmental report, and a configuration information report.

14. The system of claim 10, wherein the TG transforms the data obtained from the collection module by one or more of:
  converting the obtained data into an Extensible Markup Language (XML) schema; and
  modifying a header of the data.

15. The system of claim 10, wherein the TG sends the encrypted data securely by:
  attaching a digital certificate to the encrypted data; and
  sending the encrypted data using an Hyper Text Transfer Protocol Secure (HTTPS) connection to the server via the public network.

16. One or more non-transitory computer readable storage media encoded with software comprising computer executable instructions and when the software is executed operable to:
  register each of a plurality of devices in a customer network with a vendor network to confirm that each of the plurality of devices is entitled to transfer data to a server in the vendor network, wherein a first one of the plurality of devices is registered by: being associated with a customer profile registered with the vendor; and being associated with a valid contract or warranty in the customer profile that covers the first one of the plurality of devices;
  register a transport gateway in the customer network with the vendor network, wherein the transport gateway is configured to connect a collection module to the server in the vendor network;
  obtain data from the collection module communicatively coupled to the plurality of devices, wherein the plurality of devices provide the collection module with data in a plurality of formats;
  transform the data obtained from the collection module into a format recognized by the server, wherein transformation is performed depending on the different formats of the data obtained from the collection module;
  assort the transformed data by associating the transformed data with each of the plurality of devices;
  encrypt the assorted data; and
  send the encrypted data, along with entitlement attributes of the one or more devices, to the server securely via a public network through a single channel.

17. The computer readable storage media of claim 16, wherein the instructions operable to transform comprise instructions operable to convert the obtained data into an Extensible Markup Language (XML) schema and modify a header of the data.

18. The computer readable storage media of claim 16, further comprising instructions operable to generate the entitlement attributes during registration of the plurality of devices.

* * * * *